United States Patent [19]

Lombardi

[11] 4,311,057

[45] Jan. 19, 1982

[54] HERMETIC SEAL FOR A SHAFT

[76] Inventor: Robert A. Frosch, Administrator of the National Aeronautics and Space Administration, with respect to an invention of Frank Lombardi, Altadena, Calif.

[21] Appl. No.: 154,725

[22] Filed: May 30, 1980

[51] Int. Cl.³ .............................................. F16J 15/50
[52] U.S. Cl. ......................................... 74/18.1; 92/37; 74/18.2
[58] Field of Search ......................... 74/18, 18.1, 18.2; 92/34–39

[56] References Cited

U.S. PATENT DOCUMENTS

| | | | |
|---|---|---|---|
| 2,867,124 | 1/1959 | Quiroz | 74/18.1 |
| 3,004,439 | 10/1961 | Ross | 74/18.1 |
| 4,030,615 | 6/1977 | Guggi et al. | 74/18.1 |
| 4,058,018 | 11/1977 | Lauper | 74/18.2 |

*Primary Examiner*—Lawrence J. Staab
*Attorney, Agent, or Firm*—Paul F. McCaul; John R. Manning

[57] ABSTRACT

An hermetic seal 10 for a linear rod 12 having a portion thereof projected axially through a port 20 defined in a wall for a pressure chamber 14 and supported thereby for omni-directional motion. The seal is characterized by a resilient, impervious, cylindrical body having a first section concentrically related to the shaft and integrally affixed thereto comprising a linear ordered array of annular flutes 22, a second section integrally affixed to the wall of the chamber and concentrically related to the port comprising a second linear ordered array of annular flutes 24, and a third section interposed between said first and second sections and integrally affixed thereto in coaxial alignment therewith comprising an annular ordered array of linear flutes 26 concentrically related to the shaft, whereby axial, angular, and pivotal motion of the rod is accommodated.

1 Claim, 3 Drawing Figures

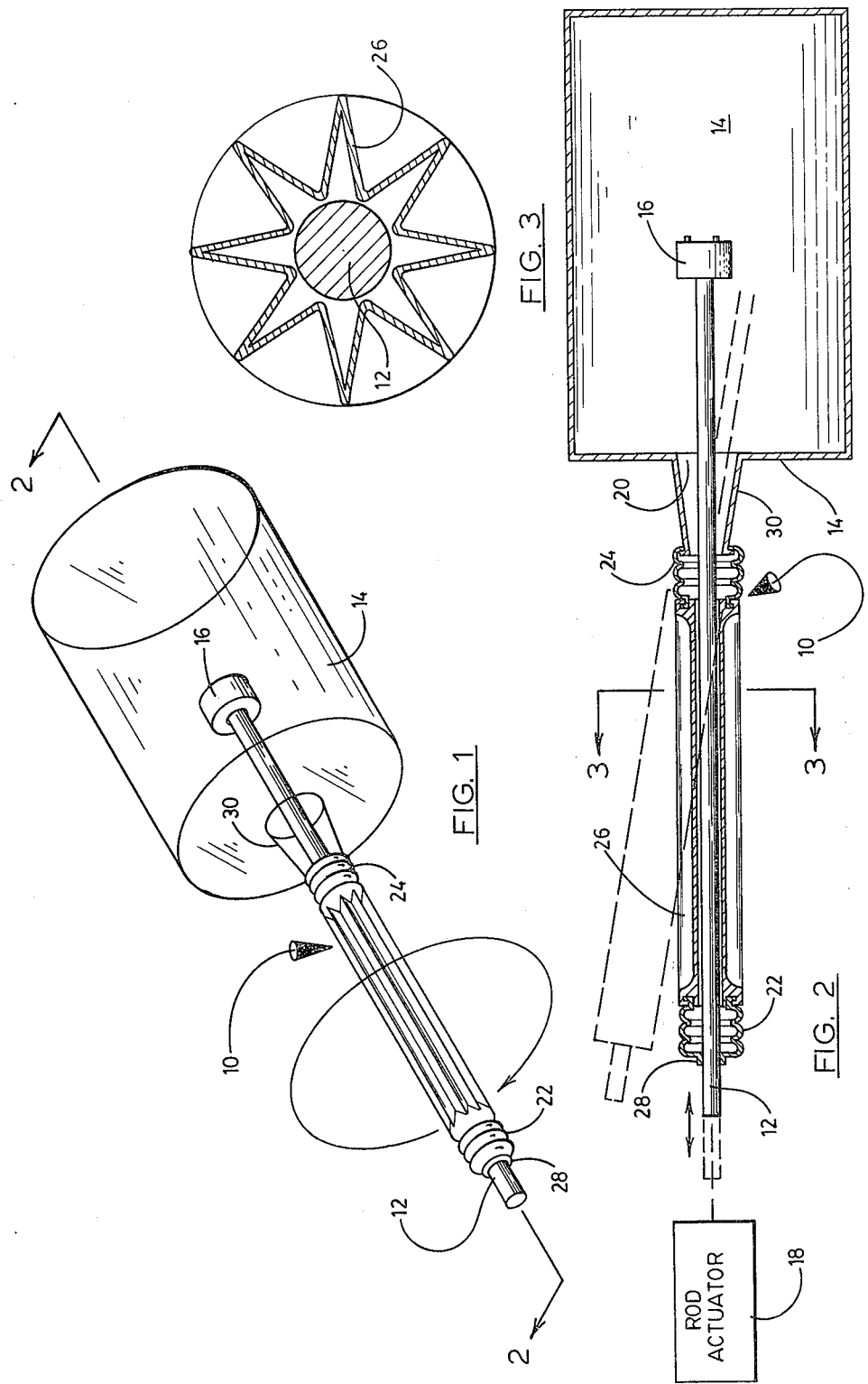

HERMETIC SEAL FOR A SHAFT

ORIGIN OF THE INVENTION

The invention described herein was made in the performance of work under a NASA Contract and is subject to the provisions of Section 305 of the National Aeronautics & Space Act of 1958, Public Law 85-568 (72 STAT 435; 42 U.S.C. 2457).

BACKGROUND OF THE INVENTION

The invention generally relates to hermetic seals for fluid pressure chambers and more particularly to an hermetic seal for a movable shaft projected axially into a vacuum chamber for a high-vacuum spectrometer.

DESCRIPTION OF THE PRIOR ART

As can be appreciated by those acquainted with the field of sample-insertion accessories for high-vacuum spectrometers, it has been found difficult to design and fabricate insertion hardware having a capability for very precise angular rotation during the analysis of samples supported in a high-vacuum environment.

Heretofore, it has been common practice to accommodate rotation of insertion hardware or sample holders, in a vacuum chamber or system, through a use of O-ring seals and the like. Unfortunately, because O-ring seals necessarily are in close proximity to the samples, during the heating thereof, the presence of the O-ring elastimer tends to contaminate the environment for specimens supported by the sample holder, due to attendent out-gassing of the elastimer. Also, as is well known, O-ring seals also tend to fail at cryogenic temperatures.

Consequently, there exists a need for a vacuum seal capable of accommodating sample-insertion accessories, such as a sample holder affixed at the projected end of a shaft-like member, for supporting the mount, in the absence of communicating sources of sample-contaminating matter.

A novelty search conducted for the invention hereinafter more fully described and claimed resulted in the following patents being discovered.

U.S. Pat. No. 2,867,124—Quiroz—Jan. 6, 1959
U.S. Pat. No. 3,004,439—T. N. Ross—Oct. 17, 1961
U.S. Pat. No. 3,289,484—Archer et al—Dec. 6, 1966
U.S. Pat. No. 3,478,607—Arbeitlang—Nov. 18, 1969
U.S. Pat. No. 3,664,202—Metzger—May 23, 1972
U.S. Pat. No. 4,030,615—Guggi et al—June 21, 1977
U.S. Pat. No. 4,058,018—Lauper—Nov. 15, 1977

While all of the patents discovered in the search generally relate to seals for motion transmitting devices, it is believed that the patent to Lauper U.S. Pat. No. 4,058,018 discloses a pressure compensated flexible bellows structure which most closely resembles the structure embodying the principles of the instant invention.

However, it is believed to be important that it be noted that the device disclosed by the patentee Lauper comprises a bellows structure having a collapsable wall portion adapted to be used as a pneumatically sealed protective cover for a movable member, such as a reciprocally mounted rod. The cover comprises an axially collapsable section comprising a bellows fabricated from a series of longitudinally spaced annular convolutions and an axially fluted center section. These sections are integrally joined in end-to-end relation in order to provide for pressure compensation resulting from axial collapse of the convolutions. The axially collapsable section and the axially fluted center section are confined within a uniform diameter and are so relatively proportioned that the sections define or enclose internal chambers having substantially the same volumetric capacity. Hence, when the ends of the bellows are moved toward each other, the convolutions of the axially collapsable section will be compressed and the flow of entrapped fluid is established from the end sections into the axially fluted center section with the result that the volumn in the axially fluted center section will be increased under increasing pressures. The flutes of the center section expand radially in order to compensate for changes in internal pressure without concern being given to matters relating to an application of torque or a communicating vacuum environment. Consequently, it is believed that the patentee Lauper does not suggest the concept or structure of the instant invention, not withstanding the apparent similarity in the structure employed.

The patent to Quiroz discloses a sealed device for transmitting partial rotary movement from a driver to a driven member, with a minimum amount of friction, and includes a resilient member adapted to accommodate tortional movement.

The patent to Ross discloses a micro-manipulator including a protective bellows by means of which a lever may be moved for causing an associated needle to perform identical movement, of smaller amplitude.

The patent to Archer et al discloses a leak-tight transmission including a diaphragm.

The patent to Arbeitlang discloses a device for use in the transmission of rotary motion, including a sealed, flexible bellows rigidly secured to the housing for enclosing a shaft.

The patent to Guggi et al discloses a bar passing through a bellows which serves to seal a high-vacuum chamber.

Finally, the patent to Metzger discloses a tortion tube having a shaft disposed concentrically thereof and secured at the closed end therefor; the tube is characterized by cavities which serve to reduce the strength of the wall.

In summary, it is believed that while the patent to Lauper discloses a structure similar in appearance to the embodiment of the invention hereinafter disclosed and claimed, the patented device is not intended, nor is it seen that it can be made to function in the manner or for the purpose for which the claimed embodiment of the invention hereinafter more fully described is intended.

It is therefore the general purpose of the instant invention to provide an hermetic seal for a shaft-like body projected through an aperture of a pressure chamber and supported for omni-directional motion, said seal being adapted to sustain both elevated and reduced temperatures, without altering the environment established within the pressure chamber.

OBJECTS AND SUMMARY OF THE INVENTION

It is an object of the instant invention to provide an improved hermetic seal for a movable member projected through an aperture defined in a wall having a pressure differential established thereacross.

It is another object to provide an hermetic seal for a movable shaft projected into a pressure chamber capable of withstanding both high and low temperatures, without adversely affecting the environment within the pressure chamber.

It is another object to provide a temperature resistant hermetic seal for a specimen-holder rod having an end portion projected through a port defined in a pressure chamber for a high-vacuum spectrometer, said seal being adapted to support an angularly displaceable mount for a sample holder disposed within the chamber and to accommodate omni-directional motion as it is imparted to the shaft.

These and other objects and advantages are achieved through the use of an hermetic seal having a capability for supporting a linear shaft with a portion thereof projected axially through a port defined in a wall defining a vacuum chamber and supported by the seal for omni-directional motion comprising an impervious temperature resistent cylindrical bellows having a first section concentrically related to the shaft and integrally affixed thereto comprising axially deformable linear bellows or an array of annular flutes, a second section integrally affixed to the wall and concentrically related to the port comprising an axial deformable linear bellows or an array of annular flutes, and a third section interposed between said first and second sections and integrally related thereto in coaxial alignment therewith, comprising an angularly deformable annular array of linear flutes concentrically related to said shaft.

DESCRIPTION OF THE DRAWINGS

FIG. 1 is a perspective view depicting an hermetic seal which embodies the principles of the instant invention for a sample-holder rod schematically shown as being inserted into a chamber.

FIG. 2 is a cross-sectional view of the seal shown in FIG. 1.

FIG. 3 is a cross-sectional view taken generally along lines 3—3 of FIG. 2.

DESCRIPTION OF THE PREFERRED EMBODIMENT

Referring now to the drawings, with more particularity, wherein like reference characters designate like or corresponding parts throughout the several views, there is shown in FIG. 1 an hermetic seal, generally designated 10, for a displaceable rod, designated 12, coupled with a chamber 14.

It here is important to note that the rod 12, as illustrated, comprises a sample-holder including a sample-holder mount 16 affixed at one end thereof. As schematically illustrated, the mount 16 is disposed within the chamber 14, which, as shown, represents a vacuum chamber for a spectrometer. Since the spectrometer forms no part of the claimed invention, a detailed description thereof is omitted. However, such a chamber may be found in an ESCA-electron spectrometer, often used for chemical analysis. In any event, it is important to note that the sample-holder rod 12 must be capable of transmitting angular motion to the mount 16, whereby a sample holder, not shown, affixed to the mount, may be rotated or angularly displaced for purposes of examination and analysis. The particular manner in which the sample-holder rod 12 is actuated may be manual, mechanical, or otherwise. For purposes of illustration, a rod actuator 18 is schematically illustrated in coupled relation with the sample-holder rod 12. However, the actuator 18 also forms no part of the claimed invention.

In any event, it is important to note that the seal 10 is readily employable in other environments in combination with other structures and is not limited in its use to a sample-holder rod in combination with a vacuum chamber.

However, as shown, the seal 10 comprises an hermetic seal connected in communication with a port 20 for the chamber 14. The purpose of the port 20 is to receive the sample-holder rod 12 and the purpose of the seal 10 is to preclude a pressure drop from occuring through the port 20.

The seal 10 generally is of an elongated cylindrical configuration and is formed of resilient sheet metal stock. Preferably, the sheet metal stock comprises a low-vacuum compatible material, such as nickel alloy. In practice, the seal includes a first axially deformable bellows defined by a linear array of flutes 22, a second axially deformable bellows defined by a linear array of flutes 24, and an angularly deformable annular array of linear flutes 26 interposed between the flutes 22 and 24 and integrally connected thereto.

In practice, the first array of flutes 22 is provided with a suitable collar 28 integrally affixed to the rod 12, as by welding or the like, while a collar 30 is provided for connecting the array of flutes 24 to the wall of the chamber 14 in coaxial relation with the port 20.

The annular array of linear flutes 26 is interposed between the arrays of flutes, designated 22 and 24, and is integrally connected in coaxial alignment therewith. As a practical matter, heliarc welds are employed for purposes of connecting the collar 28 to the shaft 12, the collar 30 to the array of flutes 24 and the walls of the chamber 14, as well as for interconnecting the arrays of flutes designated 22, 24, and 26 into an integral component.

Since the particular techniques employed in forming the flutes and interconnecting them into an integral unit form no particular part of the instant invention, and are varied as desired, a detailed description of these techniques also is omitted in the interest of brevity.

Furthermore, while it is desirable that the material from which the seal 10 is fabricated be sufficiently rigid to impart lateral stability to the sample-holder rod 12, it is important that the seal serve to accommodate angular displacement of the mount 16 for facilitating an analysis of samples supported thereby. Of course, the length of the flutes 26 of the annular array of linear flutes tend to dictate the extent to which angular displacement of the sample-holder rod 12 is accommodated, while the number and size of the annular flutes 22 and 24 tend to dictate the limits of axial displacement for the rod 12. However, it also is to be understood that other factors including the characteristics of the materials used in fabricating the seal are of significance. The annular flutes 22 and 24 expand axially to accommodate a foreshortening of the flutes 26, as these flutes angularly are deformed in response to angular displacement imparted to the shaft 12 as the mount 16 is rotated in the chamber 14. For example, the rigidity of the material employed and the dimensions of the seal must be such that the elastic limits of the material is not exceeded in response to the rod 12 being angularly displaced to the limits of its required throw. Finally, the bellows or annular flutes 24 must accommodate omni-directional pivotal motion as it is imparted to the rod 12.

OPERATION

With the seal 10, and sample-holder rod 12 mounted in a manner as depicted in FIG. 1, the rod 12 is prepared for angular displacement about a first axis passing axially through the port 20, as well as for pivotal motion about a pivotal axis normal to the first. Where the seal 10 is employed in connection with a spectrometer of the type hereinbefore mentioned, the chamber 14 comprises a chamber within which a sample is subjected to X-ray bombardment in a vacuum as low as $10^{-12}$ atmospheres (A.T.M.) or $10^{-9}$ torr. Preferably, the seal 10 accommodates angular displacement of the sample-holder rod 12 through approximately 45° for thus imparting angular displacement to the mount 16 for a sample-holder bearing a specimen to be analyzed.

As angular displacement is imparted to the sample-holder rod 12 the flutes 26 are angularly deformed, that is to say the linear flutes are twisted for thus causing the array of flutes 26 to be foreshortened. Due to the foreshortening effects of the twisting of the array of flutes 26, the flutes 22 and 24 elongate and thus expand axial, but opposite directions, for accommodating the foreshortening of the flutes 26. Since the material from which the seal 12 is formed is deformed within its elastic limits the seal returns to its initial shape in response to removal of torque from the shaft 12. Similarly, the seal resiliently accommodates pivotal motion of the rod 12.

It should therefore be apparent that the seal of the instant invention comprises a practical solution to the problems heretofore encountered by those engaged in the design and fabrication of hermetic seals for use in accommodating insertion of rods such as sample-holder rods and the like into high-vacuum chambers which, in operation, may be subjected to temperature changes within an extended range, all without adversely effecting the environment established within the chamber.

What is claimed is:

1. An hermetic seal for sealing an aperture defined in a wall having opposed first and second faces and a shaft axially extended through the aperture and supported by the seal for simultaneous pivotal, angular, and linear motion, comprising:

A. an impervious, substantially tubular body concentrically receiving said shaft in supporting relation therewith having a first end affixed to the first face of the wall in sealed relation therewith and a second end affixed to said shaft in sealed relation therewith, said second face of said wall being in communication with the interior of said body whereby said aperture is sealed by said body; and B. means for accommodating simultaneous angular, linear and pivotal motion of said shaft including means for accommodating linear motion of said shaft relative to said aperture comprising a first linear array of radially and axially deformable annular flutes defined in said tubular body adjacent to the first end thereof, and a second linear array of radially and axially deformable annular flutes defined in said tubular body adjacent the second end thereof, means for accommodating angular motion of said shaft comprising an annular array of angularly deformable flutes concentrically related to said shaft extended axially between said first and second linear arrays of deformable annular flutes, means for accommodating pivotal motion of said shaft comprising said first linear array of radially and axially deformable annular flutes, whereby angular motion imparted to said shaft causes said linear flutes to be angularly deformed and foreshortened and said annular flutes to be axially elongated and radially contracted for accommodating the foreshortening of said flutes, linear motion imparted to said shaft causes said first and second arrays of annular flutes to be axially and radially deformed, and pivotal motion imparted to said shaft causes said first array of annular flutes to be axially and radially deformed.

* * * * *